Figure 1:
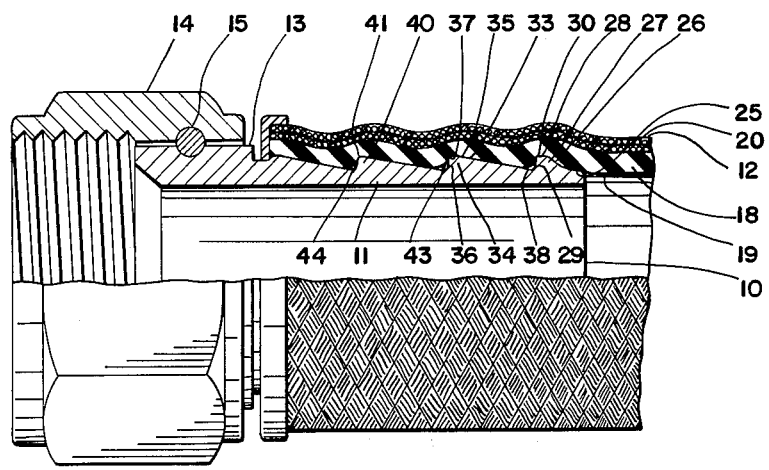

United States Patent Office 3,210,100
Patented Oct. 5, 1965

3,210,100
HOSE COUPLING
David C. Lowles, Solon, and Edgar E. Thebeault, Lyndhurst, Ohio, assignors to Parker-Hannifin Corporation, Cleveland, Ohio, a corporation of Ohio
Filed Apr. 9, 1962, Ser. No. 185,952
3 Claims. (Cl. 285—239)

This invention relates to hose couplings and more particularly to a hose coupling of the type in which a ribbed nipple is insertable within a hose of flexible rubber-like material to expand the same so that the hose is retained on the nipple by the tendency of the hose to contract about the ribs.

In hose couplings of the type described, the ribs provide shoulders and the tendency of the expanded hose to contract causes the hose to deform behind the shoulders to resist withdrawal of the nipple. The rubber hose may or may not have a braided fabric covering. When it has such a covering and the strands of the braid cross each other at or very close to a neutral angle, the braid angle changes due to expansion in diameter when the nipple is inserted and the tendency of the braid to resume its neutral angle when the hose is subjected to internal fluid pressure further tends to contract the hose more tightly about the nipple.

To provide a maximum grip upon the hose when fluid pressure is applied, the ribs should have a sharp edge transverse shoulder so as to permit the rubber of the hose to deflect sharply over the shoulder whereby the rubber will be subject to shear stresses when pull-out pressures are applied to the nipple. If the rear edge of the shoulder is rounded instead of sharp, the shear effect upon the rubber is reduced and the rubber will be more easily able to slide over the rib when pull-out pressures are applied.

Although sharp edge ribs or shoulders with a transverse rear face are most effective for providing pull-out strength, they have the disadvantage of cutting into the rubber if the rubber moves back and forth over the edge, as is the case when slight stretching and shortening of the hose occurs due to fluctuating fluid pressures. However, this tendency to rub and cut can be confined to the region of the first rib when a multiple of ribs are provided. Thus, it has been found that a multiple of ribs can be provided with the first one rounded and the remainder being sharp, the rounded rib protecting the hose against cutting and the remaining sharp edge ribs providing high holding strength.

Thus, it is an object of this invention to provide a hose nipple with sharp threads to afford high pull-out strength and with at least one rounded thread to avoid cutting of the hose material.

Another object is to provide a hose nipple with a first holding rib which is sufficiently rounded to avoid cutting of the hose material upon slight back and forth movement of the same over the rib but in which the rib is sharp enough to afford a grip upon the hose material to substantially prevent movement of the same from reaching an additional rib with a sharp holding edge spaced rearwardly of the first rib.

It is another object to provide a hose coupling of the type described in which the first rib has a front face which is tapered for leading the rib into the hose, such taper being relatively abrupt so as to provide a minimum length forwardly of the rib, and the nipple having at least one additional rib spaced rearwardly of the first rib and with a front face tapered much more gradually, the angle of the latter taper being less than the angle of friction between the nipple and hose liner to that considerable friction nipple grip is established between the tapered surface and the hose whereby endwise stretching and contraction of the hose due to pressure fluctuations is dissipated forwardly of the additional rib.

Figure 2:
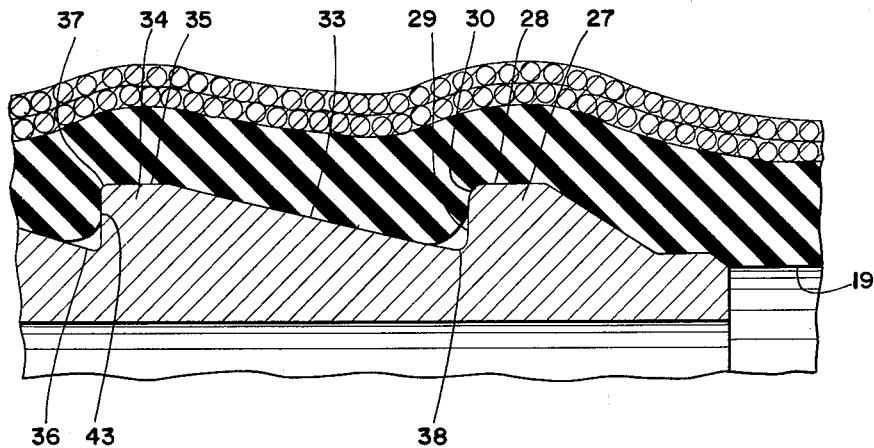

Other objects of the invention will be apparent from the following description and from the drawings in which:

FIG. 1 is a partial section view through the assembly of the nipple and hose, and FIG. 2 is an enlarged cross section view of a portion of the nipple and hose.

In the form of the invention shown, hose nipple 10 has a generally tubular portion 11 for insertion within the end of hose 12. The rear end of the nipple has an enlarged head 13 to which a swivel nut 14 is rotatably attached by means of an annular wire 15 located in matching grooves in head 13 and nut 14. The nut 14 is for attaching the nipple to any suitable externally threaded coupling member, not shown.

Hose 12 has an inner liner 18 of rubber-like material with a bore 19 therethrough.

Closely fitted about the external surface of hose liner 18 is a braided fabric covering 20 of suitable material such as cotton or rayon. To form this covering, cotton strands are interlaced so as to cross each other at a neutral angle of approximately 54° such that when the hose is subjected to internal fluid pressure the braid not only resists expansion of the hose diameter but also resists changing of its axial length. In some cases the fabric covering may in turn be covered by another layer of rubber or similar material.

The nipple has a relatively short cylindrical portion 25 at its forward end leading to tapered front face 26 of a first rib 27. Front face 26 is preferably tapered on the order of 35° from a horizontal reference line. Rib 27 has a relatively short cylindrical outer face 28 which merges with a transverse holding shoulder 29, the edge 30 between surface 28 and shoulder 29 on this rib being rounded to a radius of from .015 inch to .030 inch.

The smaller diameter portion of shoulder 29 meets with the small end of a tapered front face 33 of an additional rib 34 which likewise has a relatively short cylindrical outer surface 35.

Face 33 is tapered at an angle of about 8° and its smallest diameter is slightly larger than the initial or normal diameter of hose bore 19. The taper angle of face 33 is less than the angle of friction between tubular portion 11 of the nipple 10 and hose liner 18.

Rib 34 has a transverse rearwardly facing shoulder 36 which forms a relatively sharp edge 37 with surface 35, such sharp edge having a radius or break corner of about .003 inch or less.

Spaced rearwardly of rib 34 is another rib 40 which is identical to rib 34 and has a sharp edge 41.

On nipples for hoses having an inside diameter 19 of from ¼ inch to ¾ inch the smaller diameter 38 of the taper is approximately .005 inch larger than the diameter of hose bore 19 and the difference in diameters of the small end 38 of the adjacent taper to the outer cylindrical surface 28 or 35, as the case may be, is about .085 inch.

To assemble the joint the nipple 10 is simply pushed into the end of hose 12 to the position shown in FIG. 1. This expands both the rubber-like liner 18 and the braid covering 20. The liner, being resilient, stretches over the ribs and tends to return to its original diameter and thus deforms over rounded edge 30 and sharp edges 37, 41 in the manner clearly shown in FIG. 2. The tendency of the braid to return to its original diameter also imposes a strong clamping stress or tension upon the liner to assist in deformation of the liner material over such edges. Because of the sharpness of edges 37, 41, the rubber-like material is sharply deformed to form transverse holding shoulders 43, 44 therein and pull-out of the nipple is resisted by the shear strength of the rubber in this area.

At the first rib 27 the rounded edge 30 imposes some shear stress on the rubber liner for resisting pull-out but it also permits some sliding of the rubber over this edge as the liner axially elongates and contracts due to fluctuating internal fluid pressures. Because it is rounded, edge 30 permits this sliding without cutting or abrading its way into the wall of the liner. It has been found that a radius of .015 inch to .030 inch is large enough to avoid the cutting action on the liner and is yet small enough to retain sufficient shear action and grip upon the liner to prevent the longitudinal stretching and shortening of the liner to reach back as far as rib 34. Thus there is insufficient reciprocating motion of the rubber-like material in the vicinity of sharp edges 37, 41 to cause them to cut or abrade the liner. This situation is further enhanced by the fact that there is considerable clamping pressure between tapered face 33 and the liner. Since face 33 is ralatively long and on a small angle there is a substantial frictional force imparted in this area upon the liner for resisting movement of the liner in the vicinity of the first rib 27 to be imparted to the vicinity of the second rib 34.

In one example of an embodiment of the invention for a hose of ¾ inch inside diameter, cylindrical surface 25 and small taper end 38 are .760 inch in diameter, rib outer surfaces 27 and 35 are .855 inch in diameter and .045 inch wide, and rear transverse faces 29 and 36 are spaced .404 inch apart, Such a hose nipple when assembled to a hose with a double layer of cotton braiding withstood an internal pressure of 1000 p.s.i. without leakage or blowing off. Another sample withstood 299,470 pressure reversals of 0 to 375 p.s.i. without failure, as compared with failure of another hose assembly identical therewith except for a .003 inch radius on edge 30, after 21,055 pressure reversals.

We claim:

1. In combination, a nipple and a flexible hose for conveying high, fluctuating pressure fluids, said flexible hose having an inner liner of rubber-like expandable material surrounded by a close fitting cover of braided fabric strands, said liner and cover being capable of radial expansion but when expanded tending to return to their initial diameters, said nipple having a tubular body inserted within one end of said hose, the outer diameter of said tubular body being slightly greater than the inside diameter of said flexible hose, whereby said flexible hose resiliently grips said tubular body, said tubular body having a first rib adjacent the leading end thereof and a second rib spaced rearwardly of said first rib, each of said ribs having a rearwardly facing transverse shoulder and a cylindrical outer face which merges with said transverse shoulder to form the outer edge of said ribs, the outer edge of said first rib having a radius of from .015 to .030 inch and the outer edge of said second rib having a radius of from .000 to .005 inch, said ribs having a surface therebetween which is outwardly tapered from a position adjacent the base of the transverse shoulder of said first rib at an angle less than the angle of friction between said nipple and said hose, said tapered surface frictionally holding said hose so as to absorb at least a part of any pull-out forces not absorbed by the grip of said first rib upon said hose, said first rib also having a tapered portion forwardly thereof to facilitate insertion of said nipple into said hose, the outer diameter of each of said ribs being substantially the same and sufficiently greater than the inside diameter of said hose that said hose is expanded by said ribs but said hose still grips a substantial portion of said ribs, including said tapered surfaces and said transverse shoulders, the grip between said hose and nipple being the sole means for holding said nipple and flexible hose together.

2. The combination of claim 1 in which said tubular body has a third rib spaced rearwardly of said first and second ribs, said third rib having a configuration identical to that of said second rib, said second and third ribs also have a surface therebetween which is outwardly tapered from a position adjacent the base of the transverse shoulder of said second rib at an angle less than the angle of friction between said nipple and said hose, said hose also gripping a substantial portion of said third rib.

3. The combination of claim 1 in which said surface between said ribs has a taper of substantially eight degrees.

References Cited by the Examiner

UNITED STATES PATENTS

| | | | |
|---|---|---|---|
| 1,331,923 | 2/20 | Imbach | 285—243 |
| 1,987,499 | 1/35 | Tabozzi | 285—239 |
| 2,805,088 | 9/57 | Cline | 285—305 |
| 3,017,203 | 1/62 | MacLeod | 285—256 |
| 3,118,691 | 1/64 | Press | 285—149 |

FOREIGN PATENTS

| | | |
|---|---|---|
| 227,061 | 2/60 | Australia. |
| 892,082 | 3/62 | Great Britain. |
| 2,718 | 10/90 | Switzerland. |

CARL W. TOMLIN, *Primary Examiner.*

THOMAS F. CALLAGHAN, *Examiner.*